(12) United States Patent
Trebbi et al.

(10) Patent No.: US 9,157,784 B2
(45) Date of Patent: Oct. 13, 2015

(54) MACHINE AND METHOD FOR FILLING AND CHECKING CAPSULES

(75) Inventors: Roberto Trebbi, Castenaso (IT); Salvatore Fabrizio Consoli, Bologna (IT)

(73) Assignee: I.M.A. Industria Macchine Automatiche S.p.A. (IT)

( * ) Notice: Subject to any disclaimer, the term of this patent is extended or adjusted under 35 U.S.C. 154(b) by 957 days.

(21) Appl. No.: 13/133,699

(22) PCT Filed: Dec. 16, 2009

(86) PCT No.: PCT/IB2009/055785
§ 371 (c)(1),
(2), (4) Date: Aug. 2, 2011

(87) PCT Pub. No.: WO2010/070592
PCT Pub. Date: Jun. 24, 2010

(65) Prior Publication Data
US 2011/0277871 A1    Nov. 17, 2011

(30) Foreign Application Priority Data
Dec. 18, 2008 (IT) .............................. BO2008A0757

(51) Int. Cl.
| | |
|---|---|
| *B65B 1/04* | (2006.01) |
| *B65B 31/00* | (2006.01) |
| *G01G 17/00* | (2006.01) |
| *A61J 3/07* | (2006.01) |
| *G01G 7/06* | (2006.01) |
| *G01G 9/00* | (2006.01) |

(52) U.S. Cl.
CPC ................ *G01G 17/00* (2013.01); *A61J 3/074* (2013.01); *G01G 7/06* (2013.01); *G01G 9/005* (2013.01); *A61J 2200/74* (2013.01)

(58) Field of Classification Search
CPC ............ B65B 1/04; B65B 31/04; B65B 1/30; B65B 1/46; B65B 1/38; B65B 1/36; B65B 1/48; B65B 7/28; B65B 57/00; A61J 3/00; A61J 3/074; A61J 2200/74; G01G 17/00; G01G 7/06; G01G 9/005
USPC .................................................. 141/1, 83, 94
See application file for complete search history.

(56) References Cited

U.S. PATENT DOCUMENTS 1,716,009 A * 6/1929 Schmidt .......................... 53/281
3,501,894 A * 3/1970 Nobuhiro et al. ................ 53/281
(Continued)

FOREIGN PATENT DOCUMENTS

| CN | 1956695 A | 5/2007 |
|---|---|---|
| EP | 1512632 A2 | 3/2005 |

(Continued)

*Primary Examiner* — Timothy L Maust
*Assistant Examiner* — Andrew Schmid
(74) *Attorney, Agent, or Firm* — Laubscher, Spendlove & Laubscher, P.C.

(57) ABSTRACT

A machine for dosing a plurality of products in capsules, or similar containers, includes a plurality of dosing units for filling the capsules with respective products and a turret arrangement that rotates intermittently and is arranged for housing and moving the capsules in sequence through the dosing units. The machine further includes a plurality of checking units, each of which is located downstream of a respective dosing unit for measuring a quantity of product dosed in the capsules by the respective dosing units.

11 Claims, 3 Drawing Sheets

(56) References Cited

U.S. PATENT DOCUMENTS

| | | | |
|---|---|---|---|
| 3,538,677 A * | 11/1970 | Tollefsbol et al. | 53/299 |
| 3,757,943 A * | 9/1973 | Chae et al. | 209/551 |
| 3,933,239 A * | 1/1976 | Yoshida | 198/384 |
| 4,089,152 A * | 5/1978 | Zanasi | 53/281 |
| 4,731,979 A | 3/1988 | Yamamoto et al. | |
| 4,884,463 A * | 12/1989 | Kay | 73/865.8 |
| 4,959,943 A * | 10/1990 | Yamamoto et al. | 53/282 |
| 5,018,335 A * | 5/1991 | Yamamoto et al. | 53/281 |
| 5,555,768 A * | 9/1996 | Shaffer et al. | 73/865.8 |
| 6,170,226 B1 * | 1/2001 | Chang | 53/64 |
| 6,367,228 B1 * | 4/2002 | Wurst et al. | 53/381.4 |
| 6,425,422 B1 * | 7/2002 | Trebbi | 141/67 |
| 6,434,911 B1 * | 8/2002 | Yamamoto et al. | 53/53 |
| 8,455,773 B2 * | 6/2013 | Trebbi et al. | 177/145 |
| 2002/0170266 A1 * | 11/2002 | Yamamoto et al. | 53/53 |
| 2004/0067275 A1 * | 4/2004 | Trebbi et al. | 425/352 |
| 2005/0007588 A1 * | 1/2005 | Tarozzi et al. | 356/337 |
| 2005/0098410 A1 * | 5/2005 | Biancoli et al. | 198/757 |
| 2005/0217207 A1 * | 10/2005 | Konishi et al. | 53/53 |
| 2007/0068959 A1 | 3/2007 | D' Silva | |
| 2007/0184143 A1 * | 8/2007 | Ferrini et al. | 425/193 |
| 2008/0134629 A1 * | 6/2008 | Schmied et al. | 53/55 |
| 2008/0168750 A1 * | 7/2008 | Trebbi | 53/471 |
| 2008/0209858 A1 * | 9/2008 | Trebbi | 53/282 |
| 2008/0219803 A1 * | 9/2008 | Runft et al. | 414/21 |
| 2008/0236106 A1 * | 10/2008 | Trebbi et al. | 53/471 |
| 2010/0132313 A1 * | 6/2010 | Trebbi | 53/471 |
| 2011/0016826 A1 * | 1/2011 | Schmied et al. | 53/267 |
| 2011/0146839 A1 * | 6/2011 | Ansaloni et al. | 141/129 |
| 2011/0146840 A1 * | 6/2011 | Ansaloni et al. | 141/129 |
| 2011/0146841 A1 * | 6/2011 | Ansaloni et al. | 141/168 |
| 2011/0146843 A1 * | 6/2011 | Ansaloni et al. | 141/369 |
| 2011/0277871 A1 * | 11/2011 | Trebbi et al. | 141/1 |
| 2013/0081358 A1 * | 4/2013 | Boldis et al. | 53/408 |
| 2013/0255833 A1 * | 10/2013 | Runft et al. | 141/145 |
| 2015/0059285 A1 * | 3/2015 | Heinrich et al. | 53/167 |

FOREIGN PATENT DOCUMENTS

| | | | |
|---|---|---|---|
| JP | 2007512095 A | 5/2007 | |
| JP | 2007537814 A | 12/2007 | |
| JP | 2008514323 A | 5/2008 | |
| JP | 2008538003 A | 10/2008 | |
| WO | 2005/112868 A1 | 12/2005 | |
| WO | 2006035285 A2 | 4/2006 | |
| WO | 2006037518 A1 | 4/2006 | |
| WO | WO 2006035285 A2 * | 4/2006 | A61J 3/07 |

* cited by examiner

MACHINE AND METHOD FOR FILLING AND CHECKING CAPSULES

This application is a §371 National Stage of PCT International Application No. PCT/IB2009/055785 filed Dec. 16, 2009. PCT/IB2009/055785 claims priority to IT Application No. BO2008A000757 filed Dec. 18, 2008. The entire contents of these applications are incorporated herein by reference.

BACKGROUND OF THE INVENTION

The present invention relates to machines for filling capsules, or similar containers, with pharmaceutical products, in particular it refers to a machine for multiple doses that is suitable for filling capsules with two or more different products.

The invention also relates to a method for filling and checking capsules, or similar containers, with two or more pharmaceutical products.

In capsule-filling processes, in particular capsules of hard gelatine, with pharmaceutical products the need is known to fill capsules with combinations of two or more different products, the products differing by type (liquids, powders, granules, tablets, microtablets, late-effect drugs, etc.) and/or by the composition of the active principle.

BRIEF DESCRIPTION OF THE PRIOR ART

For this purpose filling machines are known that are provided with a plurality of dosing stations through which the capsules are conveyed in succession, such as to be progressively filled. Such machines generally comprise an intermittently rotating central turret provided with housings or cavities arranged for receiving the capsules and two or more dosing stations fixed to a base of the machine that are adjacent and around the turret. During rotation the turret moves the capsules received from a supplying and opening station in sequence through the aforesaid dosing stations.

The number of the dosing stations and the arrangement thereof around the turret depend respectively on the number of the products to be dosed in the capsules and on the particular dosing order. In effect, the products can be inserted into the capsules according to different filling combinations.

The number of the dosing stations and the arrangement thereof is defined during assembly of the machine and can sometimes be modified subsequently only by means of complex, laborious and expensive modifications.

Filling machines are further known comprising interchangeable dosing stations that are assemblable and disassemblable from the machine in a relatively easy and fast manner in function of production needs.

EP 1512632 shows an apparatus for filling capsules provided with a product dosing station made as an interchangeable module that is connectable by coupling elements with the structure of the apparatus.

Known filling machines are generally provided with weighing devices for measuring the weight of the capsules filled, with product.

Checking the weight is necessary both for rejecting capsules from production that do not conform because they contain a quantity of product that is outside the permitted dosage tolerance range and to correct possible excesses or defects in dosing the product by providing the dosing stations of the machine with feedback.

Above all in the pharmaceutical field it is important to check that the quantity of product introduced into the single capsules is exactly the quantity requested, with very narrow tolerance ranges.

In filling processes in which the weight of the capsules is considerably less than the weight of the product to be dosed—so-called "macrodoses"—the capsules are weighed only once at the end of dosing. As the weight of the empty capsules is known and falls within the preset tolerance range, it is possible to calculate the weight of the dosed product (net weight) by subtracting from the measurement of the weight of the filled capsule (gross weight) the a priori known weight of the empty capsule (tare weight). The weight variations of the empty capsules are negligible and fall within the tolerance range of the dosed product.

In filling processes in which the quantity of product to be dosed is very small—so-called "microdoses"—and/or the tolerance range required for the dose is very small, the variations in weight of the empty capsules affect and substantially influence the measurement of the weight of the filled capsule. In order to determine with precision the net weight of a capsule it is thus necessary to measure directly the weight of the dosed contents or weigh the capsule before and after dosing and calculate the difference in weight of the dosed product.

On known machines a total or statistical weight control of the capsules can be conducted. In the first case all the capsules are weighed; in the second case only a sample of randomly selected capsules is weighed.

A drawback of known filling machines for multiple doses consists of the fact that they do not allow the weight of the single dosed products to be measured as only the total weight of such products inside the capsule is measured. In order to check each product singly, it is thus necessary to remove during different production steps a sample of caps to be opened and analysed. This type of control, in addition to entailing destroying the sample of capsules, does not enable rapid interventions on machine production to be conducted if doses fall outside tolerance.

SUMMARY OF THE INVENTION

An object of the present invention is to improve multiple dosing machines that are suitable for filling capsules or similar containers with a plurality of different products, in particular for pharmaceutical use.

Another use is to provide a machine and a method that enable the weight of the filled caps to be calculated and at the same time enable the quantity of each of the dosed products in the capsules to be checked and determined.

A still further object is to obtain a flexible and versatile filling machine that enables the production type to be changed rapidly and quickly so as to fill capsules with a plurality of products that are different in terms of type and/or composition of the active principle, according to different filling combinations or orders.

A machine according to the invention is provided for dosing a plurality of products in capsules, or similar containers, including a plurality of dosing units that are suitable for filling the capsule with respective products and a turret arrangement that rotates intermittently and is arranged for housing and moving the capsules in sequence through the plurality of dosing units. The machine further includes a plurality of checking units each of which is located downstream of a respective dosing unit for measuring a quantity of product dosed in the capsules by the respective dosing units.

The checking units may include a sensor arrangement means of indirect type, for example of capacitive, inductive, microwave, X-ray type that is able to detect and measure the quantities of dosed products without interacting directly with the latter. The checking units can further include a sensor arrangement of direct type, for example a feeler device associated with linear transducers that are able to detect and measure the quantities of dosed products interacting directly with the latter.

The machine further includes a processing device connected to the checking units for receiving and processing data relating to the quantities of dosed products detected by the checking units.

A filling machine for multiple doses according to the invention enables the quantities of each of the different products dosed in the capsules to be measured. It is thus possible to check the correct multiproduct composition of the contents of the capsules and at the same time check the correct operation of each of the dosing units to perform, if necessary, adjustments or calibrations or to interrupt production.

The dosing units are arranged for dosing either liquid products, powder products, tablets, microtablets, granules or late-effect drugs. One or more of such dosing units can be provided as interchangeable modules that are removably coupled with the machine in respective operational configurations. For this purpose, the machine includes a seat arranged for housing the interchangeable dosing unit or units.

The machine of the invention thus enables product type to be changed rapidly and quickly and capsules to be filled with a plurality of products that are different in terms of type and/or composition of the active principle, according to different filling combinations or orders. By modifying the position of the interchangeable dosing units on the machine it is in fact possible to modify the sequence with which the various products are dosed in the capsules.

The machine of the invention is thus also more flexible and versatile than known filling machines for multiple doses.

The invention also provides a method for dosing a plurality of products in capsules and checking a corresponding quantity for each of the products, the method including the steps of supplying empty caps to corresponding housings of a turret that rotates intermittently around a rotation axis; opening and conveying the empty capsules in succession through a plurality of dosing units, where each of the products is dosed singularly in the caps by each corresponding dosing unit; and closing and sending the filled capsules to an exit conduit. The method further includes the step of directly or indirectly checking a quantity of product dosed by each dosing unit after each dose and before the subsequent dose, and sending data on the quantities to a processing device that is suitable for processing the data and calculating for each cap the quantity of each of the products dosed therein.

BRIEF DESCRIPTION OF THE FIGURES

The invention will now be disclosed in greater detail with reference to the attached drawings that illustrate some embodiments thereof by way of non-limiting example, in which.

DETAILED DESCRIPTION

Figure 1:
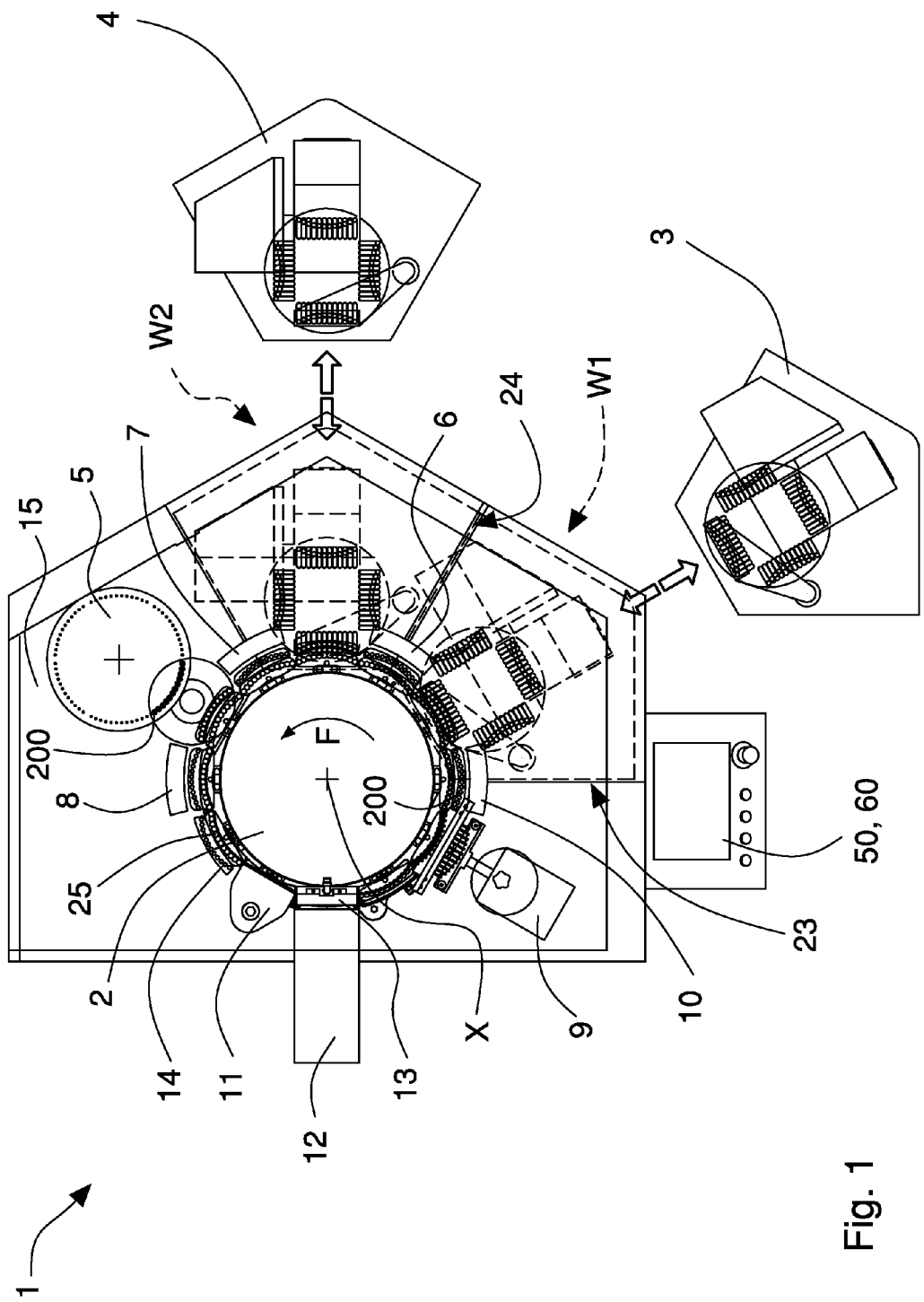
FIG. 1 is a schematic plan view of a machine for filling capsules with a plurality of products according to the invention, showing interchangeable dosing units detached from the machine in respective non-operating positions and illustrated by a dashed line, connected thereto in respective operating positions.
Figure 2:
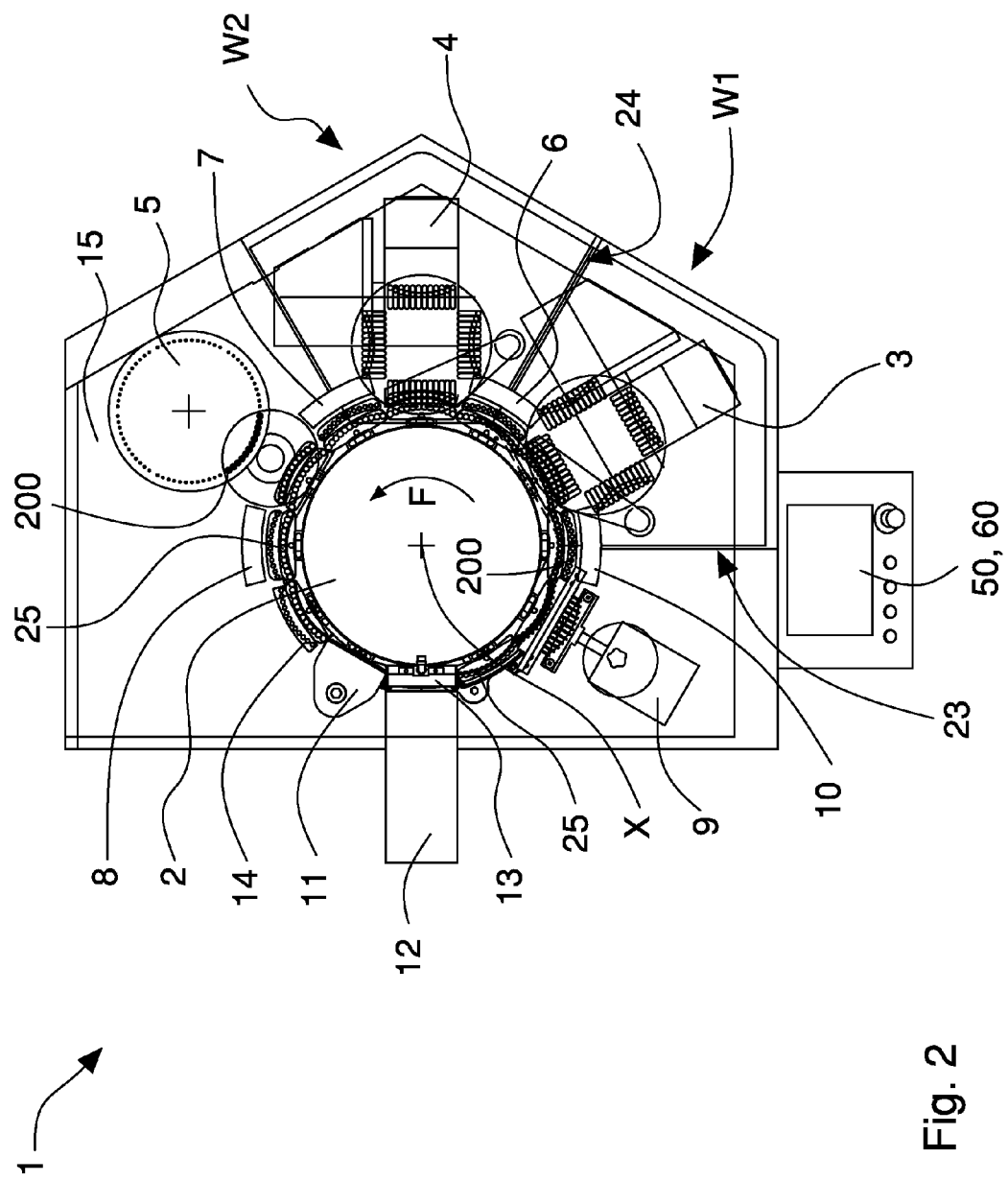
FIG. 2 is a schematic plan view of the machine in FIG. 1 showing the dosing units in respective operating positions.

With reference to FIGS. 1 and 2, there is illustrated a filling machine 1 for multiple dosing that is suitable for dosing a plurality of different products inside capsules 200, or similar containers, in particular capsules of hard gelatine.

The machine 1 is provided with a turret arrangement, of known type, including a single operating turret 2 that is intermittently rotatable around a vertical rotation axis X and a plurality of dosing units 3, 4, 5 placed adjacently and peripherally around the turret 2 for filling the capsules 200 with respective products. In the embodiment in FIGS. 1 and 2, there are three dosing units 3, 4, 5, but there could be only two or more than three.

The turret 2 is provided with a plurality of housings 25 arranged for receiving the caps 200. During operation of the machine 1, the turret 2, by rotating intermittently, for example in the direction of the arrow F in FIGS. 1 and 2, conveys the caps 200 in succession through the dosing units 3, 4, 5.

The machine 1 comprises a supplying and orienting unit 9 located upstream of the dosing units 3, 4, 5 and configured for removing empty capsules 200 from a magazine, which is not illustrated, and orienting the empty capsules 200 such that they are inserted into respective housings 25 of the turret 2 with respective lids facing upwards so as to enable respective bottoms to detach and receive the subsequent dose of the products.

A detecting unit 10 is provided downstream of the supplying and orienting unit 9 to check that all the housings 25 of the turret 2 contain respective capsules 200. If one or more capsules 200 is absent, the detecting unit 10 sends an alarm signal to a management and control unit 60 for managing and controlling the machine 1.

A closing unit 11 is provided downstream of the dosing units 3, 4, 5 to close, after filling with the different products, the capsules 200, by inserting and locking the covers on the respective bottoms.

An outlet conduit 12 receives the capsules 200 that are filled and extracted from the housings 25 from the turret 2 by an extracting unit 13.

Downstream of the outlet conduit 12 a weighing device of known type and not illustrated in the figures can be provided to weigh all, or a sample of, the caps 200.

The machine 1 further includes a selecting device 14 placed immediately upstream of the closing unit 11 to select and extract defective capsules identified during the various process steps.

The dosing units comprise, for example, a first dosing unit 3 and a second dosing unit 4 that are configured as interchangeable and optional modules, that can be removably connected to the machine 1, depending on the production required, to dose in the capsules 200 respectively a first product and a second product. In particular, the first dosing unit 3 and the second dosing unit 4 are connectable to the machine 1 in respective operating positions W1, W2, to each of which a respective operational angular sector of the turret 2 corresponds.

For this purpose the machine 1 comprises a first seat 23 and a second seat 24 arranged for receiving respectively said first dosing unit 3 and said second dosing unit 4.

The first dosing unit 3 and the second dosing unit 4 are included in a set of interchangeable dosing units that differ from one another through the filling device used, which is suitable for dosing with respective types of products.

A third dosing unit 5 is provided downstream of the second dosing unit 4 for dosing in the capsules a third product and is, for example, of fixed type. In particular, the third dosing unit 5 is fixed to and supported by a base 15 of the machine 1.

The dosing units 3, 4, 5 can be set up for dosing either products in powder or liquid form, tablets, microtablets, granules, late-effect drugs, etc.

The dosing units 3, 4, 5 enable the capsules 200 to be filled with three different products, arranged in three respective layers: a bottom layer consisting of the first product, an intermediate layer consisting of the second product and a final or top layer consisting of the third product.

By exchanging the position of the first dosing unit 3 and of the second dosing unit 4 it is possible to modify the dosing order.

Similarly, by replacing the first dosing unit 3 and/or the second dosing unit 4 with similar dosing units having various filling devices it is possible to dose various products in the capsules 200.

The machine 1 of the invention is thus very flexible and versatile as it enables production type to be changed rapidly and quickly and enables capsules 200 to be filled with a plurality of products that are different in terms of type and/or composition of the active principle, according to different filling combinations or orders.

Further, a user can initially purchase the machine 1 with a single dosing unit, keeping the option of subsequently purchasing further dosing units on the basis of production requirements, thus enabling purchasing and management costs to be significantly contained.

An embodiment of the machine 1 is provided that is not illustrated in which also the third dosing unit 5 is an interchangeable module and is arranged to being connected to the machine, received in a respective seat.

The machine 1 can obviously be set up for receiving and operating with any number of interchangeable and/or fixed dosing units.

The machine 1 comprises a plurality of checking units 6, 7, 8 each of which is located downstream of a respective dosing unit 3, 4, 5 for checking a quantity of product dosed in the capsules 200 by the respective dosing units 3, 4, 5. The dosing and checking units are stationary with respect to the intermittently rotating turret 2.

In particular, a first checking unit 6 is provided downstream of the first dosing unit 3 for checking the quantity of the first dosed product, a second checking unit 7 is provided downstream of the second dosing unit 4 to check the quantity of the second dosed product and a third checking unit 8 is provided downstream of the third dosing unit 5 to check the quantity of the third dosed product.

In absence of the interchangeable dosing units 3, 4 the respective checking units 6, 7 are disabled.

The checking units 6, 7, 8 may include a sensor arrangement of indirect type that is suitable for detecting and measuring the quantities of dosed products without interacting with the latter. Such a sensor arrangement of known type includes, for example, capacitive, inductive, microwave, or X-ray sensors.

If the dosed product is solid, for example in tablets, microtablets, or granules, the checking units 6, 7, 8 may include, alternatively, a sensor arrangement of direct type that is suitable for detecting and measuring the quantities of dosed products interacting with the latter. A sensor arrangement of direct type includes, for example, feeler elements associated with linear transducers arranged for measuring a volume occupied by the product inside each capsule.

A further sensor arrangement can be provided on the dosing units configured for dosing products in the form of powder, granules and late-effect drugs, the further sensor arrangement being suitable for measuring a compression force that is necessary for creating doses of product to be released in the capsules. Such dosing units can in fact be provided with a dosing system including hollow tubular dosers that are sunk into the product so as to create "carrots" of product, or doses, to be released into the capsules. By measuring a compression force exerted by the tubular dosers on the product and the chemical-physical conditions of the latter (compacting, density, etc) it is possible to estimate the quantity of product of each dose.

The machine 1 is provided with a processing device 50, for example, included in the management and control unit 60 that is connected to each checking unit 6, 7, 8 to receive data relating to quantities of dosed products. The processing device 50 is able to process the data and calculate for each capsule 200 the quantities of each of the products dosed therein.

The processing device 50 is further connected to the detecting unit 10 and to the further sensor arrangement, if provided in one or more dosing stations.

Owing to the checking units 6, 7, 8 it is thus possible to measure the quantities of each of the different dosed products in the capsules and check the correct multiproduct composition of the contents of the capsules 200. At the same time, the checking units 6, 7, 8 enable correct operation of each of the dosing units 3, 4, 5 to be checked, failing which it is possible to carry out possible production adjustments or interruptions.

Figure 3:
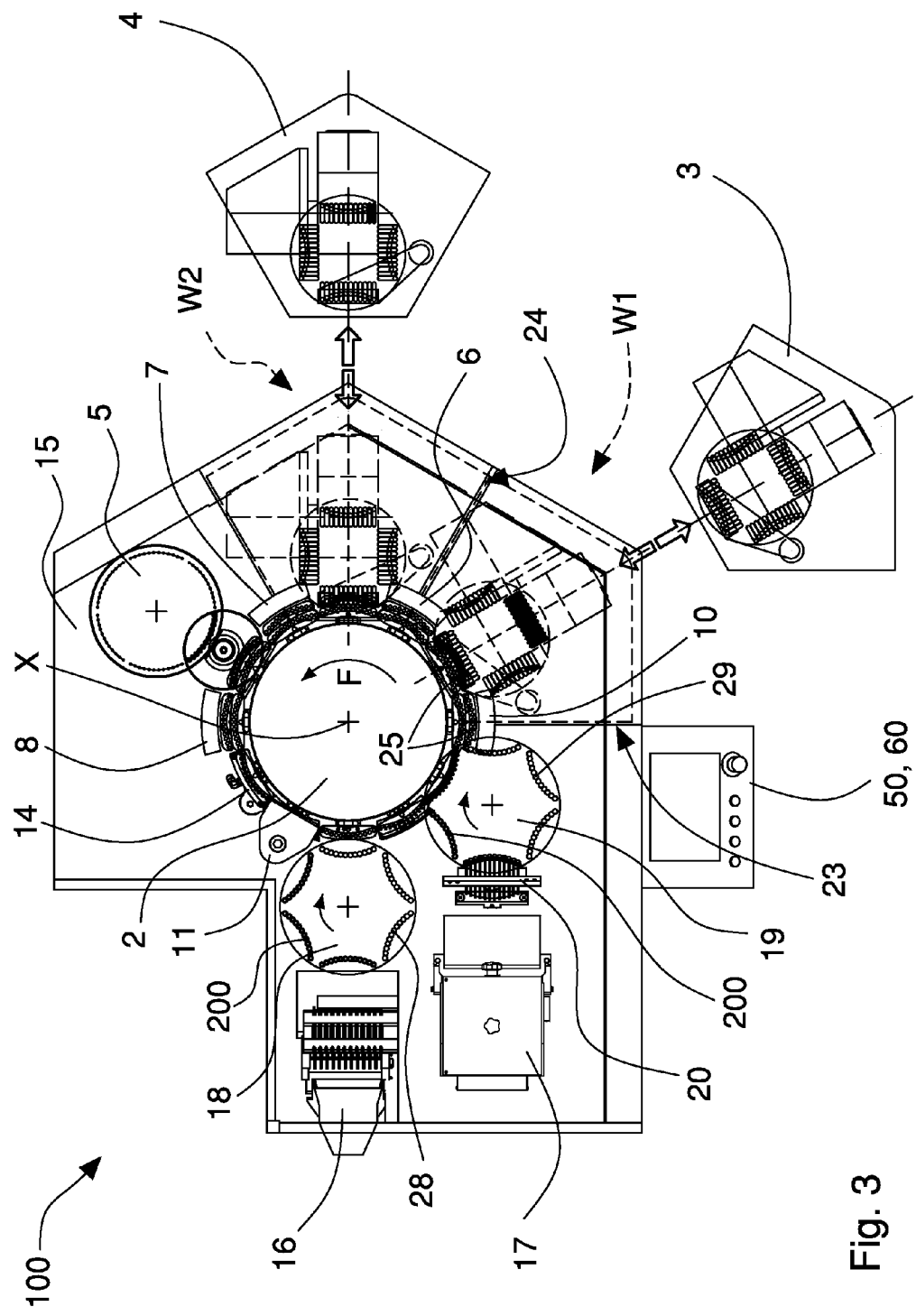
FIG. 3 is a schematic plan view of another embodiment of the machine in FIG. 1 provided with a device for weighing the capsules.

With reference to FIG. 3, there is illustrated another embodiment of the filling machine 100 for multiple dosing that differs from the embodiment previously disclosed by the fact that it includes a first weighing device 16 for weighing the capsules 200 filled with product and extracted from the turret 2 and a second weighing device 17 for weighing capsules 200 that are removed empty from a magazine which is not illustrated in the figures. The first weighing device 16 measures the gross weight of the capsules 100, whereas the second weighing device 17 measures the tare weight thereof.

A first transferring arrangement 18 is provided for transferring the capsules 200 from the turret 2 to the first weighing device 16. The first transferring arrangement 18 includes a first transferring wheel that rotates around a respective rotation axis, parallel to the rotation axis X of the turret 2, and is provided with first cavities 28 arranged for housing the capsules 200.

A second transferring arrangement 19 is provided for transferring the weighed capsules 200 from the second weighing device 17 to the turret 2. The second transferring arrangement 19 includes a second transferring wheel that rotates around a respective rotation axis, parallel to the rotation axis X of the turret 2, and is provided with second cavities 29 arranged for receiving the capsules 200.

An orienting device 20 is interposed between the second weighing device 17 and the second transferring arrangement 19 to correctly orient the empty capsules 200 in the second cavities 29. In particular, the orienting device, which is of known type and is not illustrated in detail in FIG. 3, is arranged for orienting the empty capsules 200 so that they are inserted into the second cavities 29 of the second transferring wheel 19 with respective covers facing upwards to enable respective bottoms to be separated in the turret 2.

The first weighing device 16 and the second weighing device 17 are connected to the processing device 50, which thus receives data relating to the measured weights of the capsules 200 and are able to calculate for each capsule 200 a weight difference measured before and after dosing so as to calculate a respective total quantity of the dosed products, i.e., the net weight of the capsule 200.

With the machine 100 it is thus possible to determine for each capsule 200 the quantity of the single dosed products and the total dosing weight, this enabling the dosing tolerances to be checked with precision and the correct operation of each dosing unit 3, 4, 5 to be checked.

The first weighing device 16 and the second weighing device 17 are arranged for measuring the weight of all the capsules 200 processed in the machine 100, i.e., for performing a total weight check.

In a further embodiment that is not shown, the filling machine comprises only the first weighing device 16 for measuring the gross weight of the capsules 200. This machine version 100 is suitable for filling processes in which the weight of the capsules 200 is considerably less than the weight of the products to be dosed ("macrodoses"). As the weight of the empty capsules is known, it is possible to calculate with relative precision the weight of the dosed products by subtracting from the measurement of the weight of the filled capsules weighed by the first weighing device 16, the weight of the empty capsules known a priori. The variations in weight of the empty capsules are, in fact, substantially negligible and fully contained within the tolerance range of the dosed product.

Also in this embodiment of the machine the first weighing device 16 is arranged for measuring the weight of all the capsules 200 processed in the machine 100, i.e., conducting a total weight check.

In still another embodiment of the machine that is not shown in the figures, there is provided a further supplying unit arranged for inserting into the turret 2 further empty and previously weighed capsules. Such further capsules are inserted into housings of the turret left appropriately empty. The housings are left empty according to a preset sequence, or with a random selection. The further capsules are identical in terms of physical features (dimensions, weight and tolerances) to the capsules with which the machine is supplied and come, for example, from the same production batch.

Once the further caps have been filled with the products and extracted from the turret they are separated from the capsules and sent to a weighing device that measures the gross weight thereof. The processing device compares the respective weight of each further capsule before and after dosing so as to calculate the net weight thereof, i.e., the weight of the dosed products.

In this manner a statistical type of weight check, i.e. a weight check of a sample of capsules, is performed.

The invention claimed is:

1. A machine for dosing a plurality of products in capsules, or similar containers, comprising a plurality of spaced dosing units for filling said capsules with respective products, said dosing units each inserting a dose of product within respective capsules, a turret that is intermittently rotatable and arranged for housing and moving in sequence said capsules through said plurality of dosing units, and a plurality of spaced checking units, each of which is arranged downstream of and adjacent to a corresponding dosing unit and stationary with respect to said turret to measure, as said capsules are still open, a quantity of product present in a bottom of said capsules and dosed by each of said corresponding dosing units, each dosing unit and each checking unit being positioned in succession around the periphery of said turret outside said turret, at least one checking arranged between first and second dosing units of said plurality of dosing units and upstream of said second dosing unit.

2. A machine according to claim 1, wherein said checking units comprise a sensor arrangement of indirect type that is suitable for detecting and measuring said quantities of dosed products without directly interacting therewith.

3. A machine according to claim 2, wherein said sensor arrangement of indirect type includes either a capacitive sensor or an inductive sensor, or a microwave sensor, or X-ray sensors.

4. A machine according to claim 1, wherein said checking units comprise a sensor arrangement of direct type that is suitable for detecting and measuring said quantities of dosed products by directly interacting with the latter.

5. A machine according to claim 4, wherein said sensor arrangement of direct type comprises a feeler element associated with linear transducers arranged for measuring a volume occupied by said dosed products.

6. A machine according to claim 1, and further comprising a processing device connected with said checking units to receive and process data relating to dosed product quantities detected by said checking units.

7. A machine according to claim 1, wherein at least one of said dosing units is interchangeable and movably coupled with said machine in a respective operating position.

8. A machine according to claim 1, wherein at least one of said dosing units is fixed to, and supported by, a base of said machine.

9. A machine according to claim 1, and further comprising a first weighing device for weighing capsules filled with said products and extracted from said turret arrangement.

10. A machine according to claim 9, and further comprising a second weighing device for weighing empty capsules with which to supply said turret.

11. A machine according to claim 10, and further comprising a processing device connected with said first weighing device and with said second weighing device for receiving data relating to weights measured by said weighing devices and for calculating for each capsule a weight difference measured before and after dosing, so as to calculate a respective overall quantity of said dosed products.

* * * * *